US012357541B2

(12) United States Patent
Fulper

(10) Patent No.: US 12,357,541 B2
(45) Date of Patent: Jul. 15, 2025

(54) TWO PART ROTARY DIE ENCAPSULATION SYSTEM

(71) Applicant: R.P. Scherer Technologies, LLC, Carson City, NV (US)

(72) Inventor: Lester David Fulper, Clearwater, FL (US)

(73) Assignee: R.P. Scherer Technologies, LLC, Carson City, NV (US)

( * ) Notice: Subject to any disclaimer, the term of this patent is extended or adjusted under 35 U.S.C. 154(b) by 92 days.

(21) Appl. No.: 17/922,069

(22) PCT Filed: Apr. 30, 2021

(86) PCT No.: PCT/US2021/030053
§ 371 (c)(1),
(2) Date: Oct. 28, 2022

(87) PCT Pub. No.: WO2021/222681
PCT Pub. Date: Nov. 4, 2021

(65) Prior Publication Data

US 2023/0165757 A1 Jun. 1, 2023

Related U.S. Application Data

(60) Provisional application No. 63/018,804, filed on May 1, 2020.

(51) Int. Cl.
*A61J 3/07* (2006.01)
*B65B 9/04* (2006.01)

(52) U.S. Cl.
CPC ................ *A61J 3/07* (2013.01); *A61J 3/074* (2013.01); *B65B 9/04* (2013.01); *B65B 9/042* (2013.01); *B65B 2009/047* (2013.01)

(58) Field of Classification Search
CPC ..... B65B 9/04; B65B 9/042; B65B 2009/047; A61J 3/07; A61J 3/074; Y10S 53/90
(Continued)

(56) References Cited

U.S. PATENT DOCUMENTS 2,288,327 A * 6/1942 Scherer .................... A61J 3/07 53/560
2,497,212 A * 2/1950 Donofrio ................. A61J 3/07 53/560
(Continued)

FOREIGN PATENT DOCUMENTS

CO 6660493 A2 4/2013
WO 0028976 A1 5/2000
(Continued)

OTHER PUBLICATIONS

International Search Report and Written Opinion for PCT/US2021/030053 mailed Sep. 16, 2021, 19 pages.
(Continued)

*Primary Examiner* — Stephen F. Gerrity
(74) *Attorney, Agent, or Firm* — Lowenstein Sandler LLP

(57) ABSTRACT

Disclosed herein are a rotary die encapsulation system and process for manufacturing capsules and uses thereof. The rotary die encapsulation system and process may be used for improving content uniformity of a multi-phase fill composition in a capsule. The rotary die encapsulation system and process may also be used for tuning dose strength of a fill composition in a capsule.

2 Claims, 4 Drawing Sheets

(58) Field of Classification Search
USPC .......................................... 53/454, 560, 900
See application file for complete search history.

(56) References Cited

U.S. PATENT DOCUMENTS

| | | | | |
|---|---|---|---|---|
| 4,817,367 | A | 4/1989 | Ishikawa et al. | |
| 6,574,945 | B2 * | 6/2003 | Martinez, Jr. | B65B 29/10 53/239 |
| 2003/0014946 | A1 | 1/2003 | Steele et al. | |
| 2005/0008677 | A1 | 1/2005 | Modliszewski et al. | |
| 2005/0073066 | A1 * | 4/2005 | Victorov et al. | A61J 3/07 425/112 |
| 2005/0136104 | A1 | 6/2005 | Rowe et al. | |
| 2007/0082045 | A1 | 4/2007 | Yamanaka et al. | |
| 2008/0038334 | A1 | 2/2008 | Zazula et al. | |
| 2008/0307753 | A1 | 12/2008 | Kessel | |
| 2012/0049410 | A1 | 3/2012 | Altamar et al. | |
| 2012/0052118 | A1 | 3/2012 | Altamar et al. | |
| 2012/0128765 | A1 * | 5/2012 | Brocker et al. | A61J 3/07 53/454 |
| 2013/0248563 | A1 | 9/2013 | Baker et al. | |
| 2013/0280323 | A1 | 10/2013 | Fang et al. | |
| 2014/0110500 | A1 | 4/2014 | Crichton et al. | |
| 2015/0174008 | A1 | 6/2015 | Salazar Altamar | |
| 2016/0038420 | A1 | 2/2016 | Brunel et al. | |
| 2017/0049707 | A1 | 2/2017 | Yang et al. | |
| 2017/0239142 | A1 * | 8/2017 | Fulper et al. | A61J 3/07 |
| 2020/0022874 | A1 * | 1/2020 | Yang et al. | A61J 3/074 |
| 2020/0078268 | A1 * | 3/2020 | Choi | A61J 3/07 |

FOREIGN PATENT DOCUMENTS

| | | | | |
|---|---|---|---|---|
| WO | WO-0154645 | A1 * | 8/2001 | A61J 3/07 |
| WO | 2012017326 | A2 | 2/2012 | |
| WO | 2020112953 | A1 | 6/2020 | |

OTHER PUBLICATIONS

Extended European Search Report for European Application No. 21795845.3, mailed Apr. 4, 2024, 11 Pages.
Office Action for Colombian Patent Application No. 20220017247, mailed Jan. 9, 2025, 17 Pages.

* cited by examiner

TWO PART ROTARY DIE ENCAPSULATION SYSTEM

CROSS REFERENCE TO RELATED APPLICATION(S)

The present application is a national stage entry under 35 U.S.C. § 371 of International Application No. PCT/US2021/030053, filed on Apr. 30, 2021, which claims priority to U.S. Provisional Patent Application No. 63/018,804, filed on May 1, 2020, which are herein incorporated by reference in their entirety.

FIELD OF THE INVENTION

The present invention relates generally to a two part rotary die encapsulation system and process for manufacturing capsules.

BACKGROUND OF THE INVENTION

The standard rotary die encapsulation process conventionally includes a single dispensing pump injecting a predetermined amount of fill composition through a wedge and into ribbons of gel trapped between the dies and the wedge, forcing the ribbons to distort to the shape of the die, thus forming a capsule when the edges of the ribbons are fused together from the heat of the wedge. This process works in instances where the fill composition is a solution or a homogenous multiphase system resistant to phase separation.

However, in instances when the fill system is comprised of multiple phases that can settle or separate prior to being injected between the ribbons, content uniformity issues commonly arise that make the capsule unsuitable for its intended use.

Currently content uniformity issues are addressed by tweaking the formulation to prevent phase separation or segregation. The most common approach is to adjust the rheology of the formulation such that sedimentation due to gravity is minimized; however, in the process of moving or mixing liquid systems that contain multiple phases exhibiting different densities of the phases, the motion of the liquid can impart centrifugal forces that can cause an otherwise homogenous system to segregate. The centrifugal force can exceed that of gravity and cause an otherwise stable suspension to segregate. This problem with liquid systems used in the rotary die process can be very problematic to address. The required viscosity to prevent phase segregation may be so high as to cause manufacturing problems such high line loss of viscous material adhering to transfer line walls and problems with the standard pumps used to meter the formulation to the wedge. In addition, the added excipients may impart undesirable properties to the formulation such as slowing or preventing dispersion of the formulation once ingested, or adversely affect stability profiles of the formulation.

There exists a need for rotary die processes and apparatus that address content uniformity issues in multi-phase systems with minimal impact to the formulation (e.g., to the physical and/or chemical stability of the formulation, the release profile and/or dissolution profile of the formulation, the bioavailability and/or clinical performance of the formulation, the physical and/or chemical properties of the formulation) and to the hardware used to process the formulation (e.g., pumps).

OBJECTS AND SUMMARY OF THE INVENTION

It is an object of certain embodiments of the present invention to provide a rotary die encapsulation system and method for encapsulating multi-phase formulations.

It is an object of certain embodiments of the present invention to provide a rotary die encapsulation system and method to minimize phase segregation of multi-phase formulations during the filling process.

It is an object of certain embodiments of the present invention to provide a rotary die encapsulation system and method to minimize the use of rheology modifying excipients when formulating multi-phase formulations prone to phase segregation.

It is an object of certain embodiments of the present invention to provide a rotary die encapsulation system and method for manufacturing multi-phase dosage forms with minimal API content variability between dosage forms.

It is an object of certain embodiments of the present invention to provide a rotary die encapsulation system and method for processing low viscosity multi-phase systems.

It is an object of certain embodiments of the present invention to provide a rotary die encapsulation system and method for processing multi-phase formulations having a low concentration of one of the phases (e.g., of a minor phase).

It is an object of certain embodiments of the present invention to provide a rotary die encapsulation system and method for processing multi-phase formulations with large density differentials between the different phases.

It is an object of certain embodiments of the present invention to provide a rotary die encapsulation system and method for processing multi-phase formulations with high separation rates for one of the phases (e.g., for the minor phase such as due to the phase being comprised of large particle sizes).

It is an object of certain embodiments of the present invention to provide a rotary die encapsulation system and method for processing multi-phase formulations with minimal damage to processing equipment (e.g., minimal plugging or damage to pumps, wedge, or plumbing) and/or minimal damage to the formulation (e.g., to solid fragile particles).

It is an object of certain embodiments of the present invention to provide a rotary die encapsulation system and method for manufacturing multi-component formulations (whether the multi-component formulations are miscible, immiscible, or partially miscible) where the amount of one of the components is to be controlled with greater precision and accuracy as compared to other components (e.g., the amount of a highly potent API).

It is an object of certain embodiments of the present invention to provide a rotary die encapsulation system and method for tuning formulation dosage strength in-situ.

The above objects of the present invention and others may be achieved by the present invention which in some embodiments is directed to a rotary die encapsulation system, a method for improving content uniformity of a multi-phase fill composition, and a method for tuning dose strength of a capsule fill composition, and/or to a dosage form prepared according to any of the methods or with any of the systems disclosed herein.

In one embodiment, the rotary die encapsulation system includes a first rotating encapsulation die comprising a first set of die cavities; a second rotating encapsulation die comprising a second set of die cavities; a wedge positioned between the first rotating encapsulation die and the second rotating encapsulation die; one or more dispensing tubes integrated into the wedge and aligned with at least one cavity in the first set of die cavities and/or in the second set of die cavities, the one or more dispensing tubes configured to inject a first fill composition and a second fill composition into the at least one cavity; a first mechanical dispensing mechanism for dispensing a first amount of a first fill composition via a first feeding tube to the one or more dispensing tubes; and a second mechanical dispensing mechanism for dispensing a second amount of a second fill composition via a second feeding tube to the one or more dispensing tubes. The rotary die encapsulation system may also include a continuous first film on the first rotating encapsulation die and a continuous second film on the second rotating encapsulation die.

In another embodiment, the method for improving content uniformity of a multi-phase fill composition includes: preparing a first fill composition; preparing a second fill composition comprising an active pharmaceutical ingredient (API); forming a continuous first film on a first rotating encapsulation die comprised of a first set of die cavities; forming a continuous second film on a second rotating encapsulation die comprised of a second set of die cavities; mechanically dispensing, using a first mechanical dispensing mechanism, a first amount of the first fill composition via a first feeding tube to a first dispensing tube, the first dispensing tube being integrated into a wedge positioned between the first rotating encapsulation die and the second rotating encapsulation die and aligned with at least one cavity in the first set of die cavities or in a second set of die cavities; mechanically dispensing, using a second mechanical dispensing mechanism, a second amount of the second fill composition via a second feeding tube to a second dispensing tube, wherein the second dispensing tube is either the same as the first dispensing tube or separate from the first dispensing tube; rotating the first rotating encapsulation die and the second rotating encapsulation die in counter directions to contact the continuous first film and continuous second film between the first rotating encapsulation die and the second rotating encapsulation die to form a closed capsule and trap the first amount of the first fill composition and the second amount of the second fill composition within the closed capsule between the continuous first film and the continuous second film.

In yet another embodiment, the method for tuning dose strength of a capsule fill composition includes preparing a first fill composition; preparing a second fill composition; forming a continuous first film on a first rotating encapsulation die comprised of a first set of die cavities; forming a continuous second film on a second rotating encapsulation die comprised of a second set of die cavities; mechanically dispensing, using a first mechanical dispensing mechanism, a first amount of the first fill composition via a first feeding tube to a first dispensing tube, the first dispensing tube being integrated into a wedge positioned between the first rotating encapsulation die and the second rotating encapsulation die and aligned with at least one cavity in the first set of die cavities and/or in the second set of die cavities; mechanically dispensing, using a second mechanical dispensing mechanism, a second amount of the second fill composition via a second feeding tube to a second dispensing tube, wherein the second dispensing tube may be the same as the first dispensing tube or separate from the first dispensing tube; rotating the first rotating encapsulation die and the second rotating encapsulation die in counter directions to contact the continuous first film and continuous second film between the first rotating encapsulation die and the second rotating encapsulation die to form a closed capsule and trap the first amount of the first fill composition and the second amount of the second fill composition within the closed capsule between the continuous first film and the continuous second film, wherein the dose strength of the capsule fill composition is determined by the first amount of the first fill composition and the second amount of the second fill composition.

In one embodiment, a dosage form prepared according to the methods described herein and/or with any of system described herein is disclosed.

BRIEF DESCRIPTION OF THE DRAWINGS

The above and other features of the present disclosure, their nature, and various advantages will become more apparent upon consideration of the following detailed description, taken in conjunction with the accompanying drawings, in which.

DEFINITIONS

Figure 1:
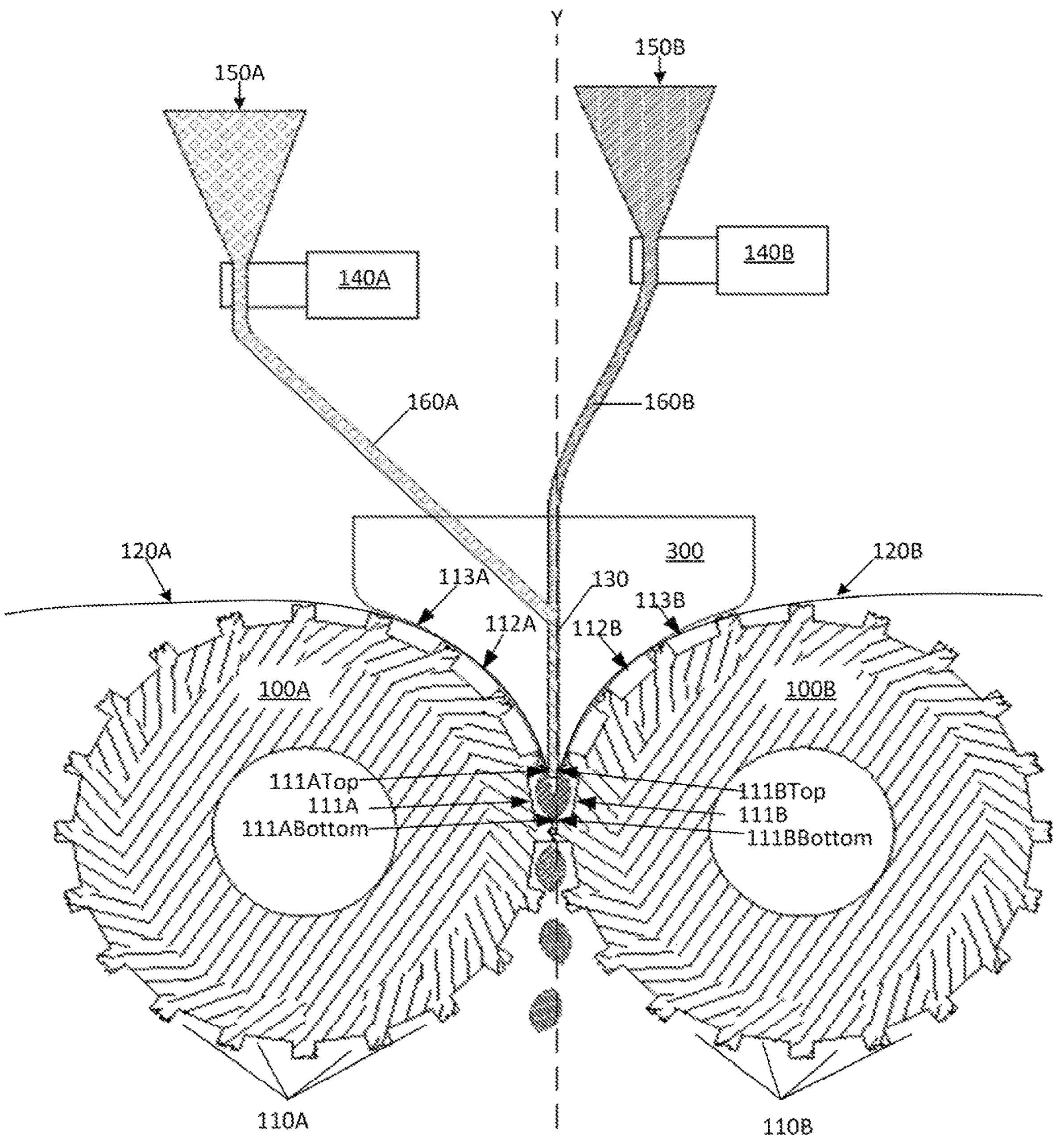
FIG. 1 illustrates a rotary die apparatus according to embodiments disclosed herein.

As used herein, the singular forms "a," "an," and "the" include plural references unless the context clearly indicates otherwise. Thus, for example, reference to "an active agent" includes a single active agent as well as a mixture of two or more active agents, and the like.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. In certain embodiments, the term "about" includes the recited number ±10%, such that "about 10" would include from 9 to 11.

As used herein, the terms "active agent," "active ingredient," "active pharmaceutical ingredient," "API," and "drug" refer to any material that is intended to produce a therapeutic, prophylactic, or other intended effect, whether or not approved by a government agency for that purpose. These terms with respect to specific agents include all pharmaceutically active agents, all pharmaceutically acceptable salts thereof, complexes, stereoisomers, crystalline forms, co-crystals, ether, esters, hydrates, solvates, and mixtures thereof, where the form is pharmaceutically active. In certain embodiment, the term "active ingredient" may refer to a material intended to produce a cosmetic effect (with or without a therapeutic effect), whether or not approved by a government agency for that purpose.

As used herein, the term "stereoisomers" is a general term for all isomers of individual molecules that differ only in the orientation of their atoms in space. It includes enantiomers and isomers of compounds with one or more chiral centers that are not mirror images of one another (diastereomers).

The term "enantiomer" or "enantiomeric" refers to a molecule that is nonsuperimposable on its mirror image and hence optically active wherein the enantiomer rotates the plane of polarized light in one direction by a certain degree, and its mirror image rotates the plane of polarized light by the same degree but in the opposite direction.

The term “chiral center” refers to a carbon atom to which four different groups are attached.

“Pharmaceutically acceptable salts” include, but are not limited to, inorganic acid salts such as hydrochloride, hydrobromide, sulfate, phosphate and the like; organic acid salts such as formate, acetate, trifluoroacetate, maleate, tartrate and the like; sulfonates such as methanesulfonate, benzenesulfonate, p-toluenesulfonate and the like; amino acid salts such as arginate, asparaginate, glutamate and the like; metal salts such as sodium salt, potassium salt, cesium salt and the like; alkaline earth metals such as calcium salt, magnesium salt and the like; and organic amine salts such as triethylamine salt, pyridine salt, picoline salt, ethanolamine salt, triethanolamine salt, discyclohexylamine salt, N,N'-dibenzylethylenediamine salt and the like.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to illuminate certain materials and methods and does not pose a limitation on scope. No language in the specification should be construed as indicating any non-claimed element as essential to the practice of the disclosed materials and methods.

DETAILED DESCRIPTION

The present invention is directed to a two part rotary die encapsulation system and process and uses thereof for manufacturing capsules. The systems and processes described herein can be used to advantageously minimize problems of phase segregation in a multi-phase fill system, improve API dose uniformity across a plurality of capsules, reduce use of rheology modifying excipients, adjust in a single batch (e.g., in-situ) API dosage strength in a capsule, provide better control and precision for the fill composition.

The above advantages and others are attained with the systems and processes described herein which divide the formulation into two parts. Each part is formulated separately. Furthermore, the manner of introduction of each part can be independently controlled to attain target properties (e.g., phase uniformity, dosing, and the like).

Embodiments of the two part rotary die encapsulation system and process will be described in detail with respect to the Figures.

FIG. 1 illustrates a rotary die apparatus according to embodiments disclosed herein. In the depicted embodiment, the system includes a first rotating encapsulation die 100A and a second rotating encapsulation die 100B. The first rotating encapsulation die 100A includes a first set of die cavities 110A. The second rotating encapsulation die 100B includes a second set of die cavities 110B. A continuous first film 120A and a continuous second film 120B may be formed on a first and a second drum, respectively (not shown in the figure), and then threaded over the first rotating encapsulation die 100A and over the second rotating encapsulation die 100B, respectively.

In the depicted embodiment, the system further includes a wedge 300 positioned between the first rotating encapsulation die 100A and the second rotating encapsulation die 100B.

In certain embodiments, the system may further include one or more dispensing tubes integrated into the wedge and aligned with at least one cavity in the first set of die cavity and/or in the second set of die cavities. For instance, in the embodiment depicted in FIG. 1, one dispensing tube 130 is integrated into the center of wedge 300. The center of the wedge 300 in FIG. 1 is depicted along vertical axis Y. Dispensing tube 130 is aligned with a first center cavity 111A in the first set of die cavities 110A of the first rotating encapsulation die 100A and with a second center cavity 111B in the second set of die cavities 110B of the second rotating encapsulation die 100B. The first center cavity 111A and the second center cavity 111B together form a first pair 111 of die cavities configured to ultimately form a complete capsule.

Figure 4:
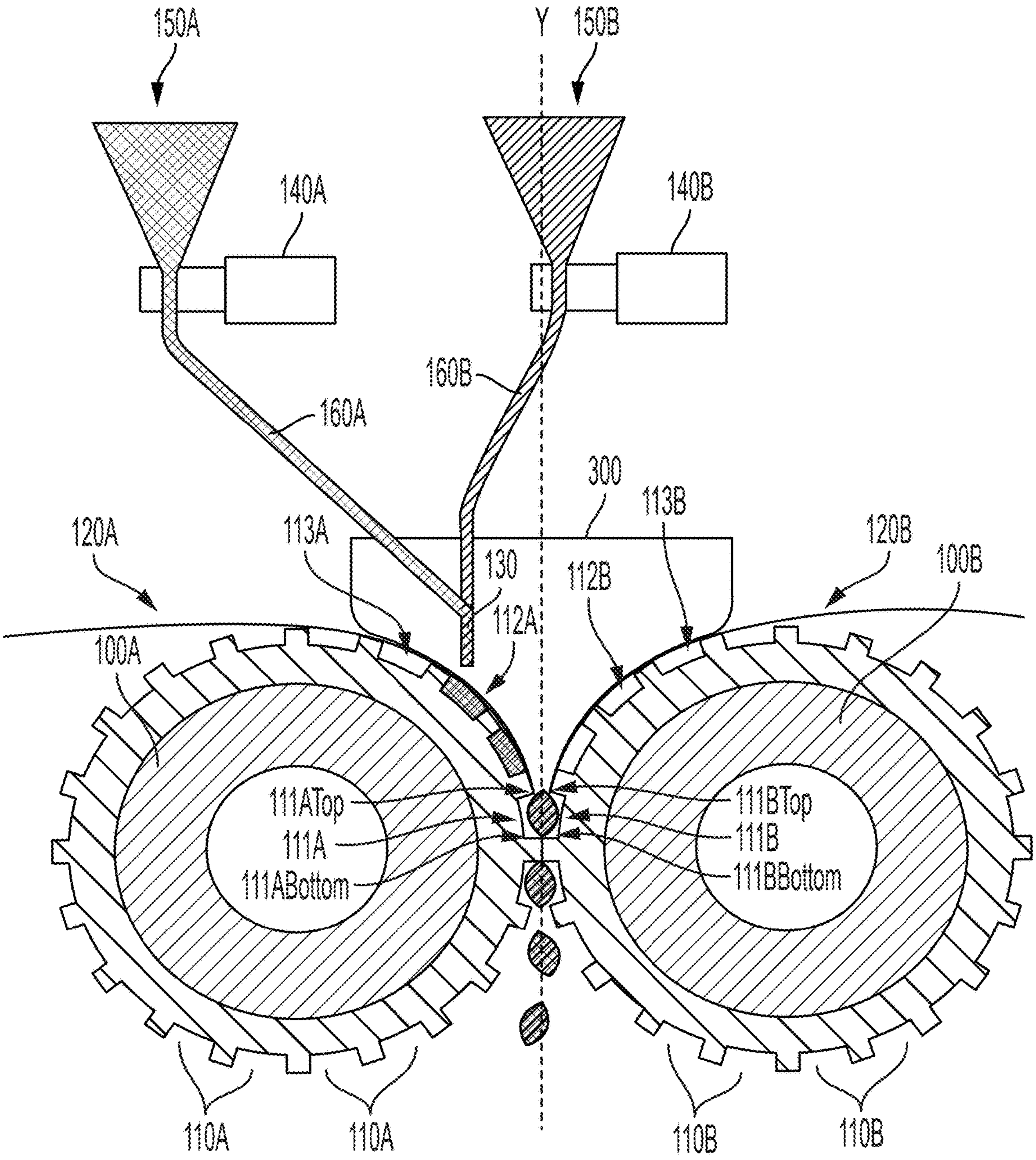
FIG. 4 illustrates a rotary die apparatus according to embodiments disclosed herein.

As can be seen in FIG. 4, single joint dispensing tube 130 may also be integrated off-center into wedge 300 and be aligned with an off-center cavity (e.g., first off-center cavity 112A in the first set of die cavities 110A of the first rotating encapsulation die 100A or with a second off-center cavity 112B in the second set of die cavities 110B of the second rotating encapsulation die 100B). The first off-center cavity 112A and the second off-center cavity 112B together form a second pair 112 of die cavities. Similarly, single joint dispensing tube may be integrated in an off-center position in wedge 300 and be aligned with any other suitable off-center cavity (e.g., 113A, 113B, and the like).

In certain embodiments, the system further includes a first mechanical dispensing mechanism 140A. The first mechanical dispensing mechanism 140A may be coupled to a first reservoir/container 150A filled with a first fill composition. The first mechanical dispensing mechanism 140A may also be coupled to a first feeding tube 160A. The first mechanical dispensing mechanism 140A is configured for dispensing a first amount of a first fill composition from a first reservoir/container 150A via the first feeding tube 160A to dispensing tube 130.

Similarly, the system further includes a second mechanical dispensing mechanism 140B. The second mechanical dispensing mechanism 140B may be coupled to a second reservoir/container 150B filled with a second fill composition. The second mechanical dispensing mechanism 140B may also be coupled to a second feeding tube 160B. The second mechanical dispensing mechanism 140B is configured for dispensing a second amount of a second fill composition from a second reservoir/container 150B via a second feeding tube 160B to dispensing tube 130.

In the embodiment depicted in FIG. 1, first feeding tube 160A and second feeding tube 160B converge together into a single joint dispensing tube 130.

First feeding tube 160A transitions into dispensing tube 130 and may be an integral continuation of dispensing tube 130. Alternatively, first feeding tube 160A may be a separate component from dispensing tube 130 and the two may be joined/coupled to form a continuous pathway for the first fill composition from the first reservoir/container 150A, via first feeding tube 160A, to dispensing tube 130, and ultimately into at least one cavity in the first set of dies cavities or in the second set of die cavities (e.g., first center cavity 111A and second center cavity 111B, or any off-center cavity such as 112A, 112B, 113A, and 113B).

Similarly, second feeding tube 160B transitions into dispensing tube 130 and may be an integral continuation of dispensing tube 130. Alternatively, second feeding tube 160B may be a separate component from dispensing tube 130 and the two may be joined/coupled to form a continuous pathway for the second fill composition from the second reservoir/container 150B, via second feeding tube 160B, to dispensing tube 130, and ultimately into at least one cavity in the first set of dies cavities or in the second set of die cavities (e.g., first center cavity 111A and second center cavity 111B, or any off-center cavity such as 112A, 112B, 113A, and 113B).

In certain embodiments, the system further include a synchronization mechanism (not shown) configured to precisely time the dispensing of the first amount from the first fill composition and/or the second amount from the second fill composition with the rotation of the first and second rotary dies. The synchronization mechanism may be useful for synchronizing the rotation of at least one of the first rotating encapsulation die 100A or the second rotating encapsulation die 100B with the first mechanical dispensing mechanism 140A and the second mechanical dispensing mechanism 140B such that the first amount of the first fill composition and the second amount of the second fill composition are timely trapped between the continuous first film 120A and the wedge 300 in the at least one cavity in the first set of dies cavities and/or in the second set of dies cavities to form a one half capsule or a complete capsule (e.g., in the first center cavity 111A and in a second center cavity 111B or in an off center cavity such as 112A, 112B, 113A, or 113B). In the embodiment depicted in FIG. 1, the first cavity 111A and the second cavity 111B are filled jointly, forming the complete capsule (i.e., both halves) at once.

Synchronization may be attained via mechanical means such as, without limitations, gears that maintain a mechanical linkage between the mechanical dispensing mechanisms and the rotating encapsulation dies, or by means of encoding device that could track the position of the encapsulation dies and signal the mechanical dispensing mechanisms, or a combination thereof.

Figure 2:
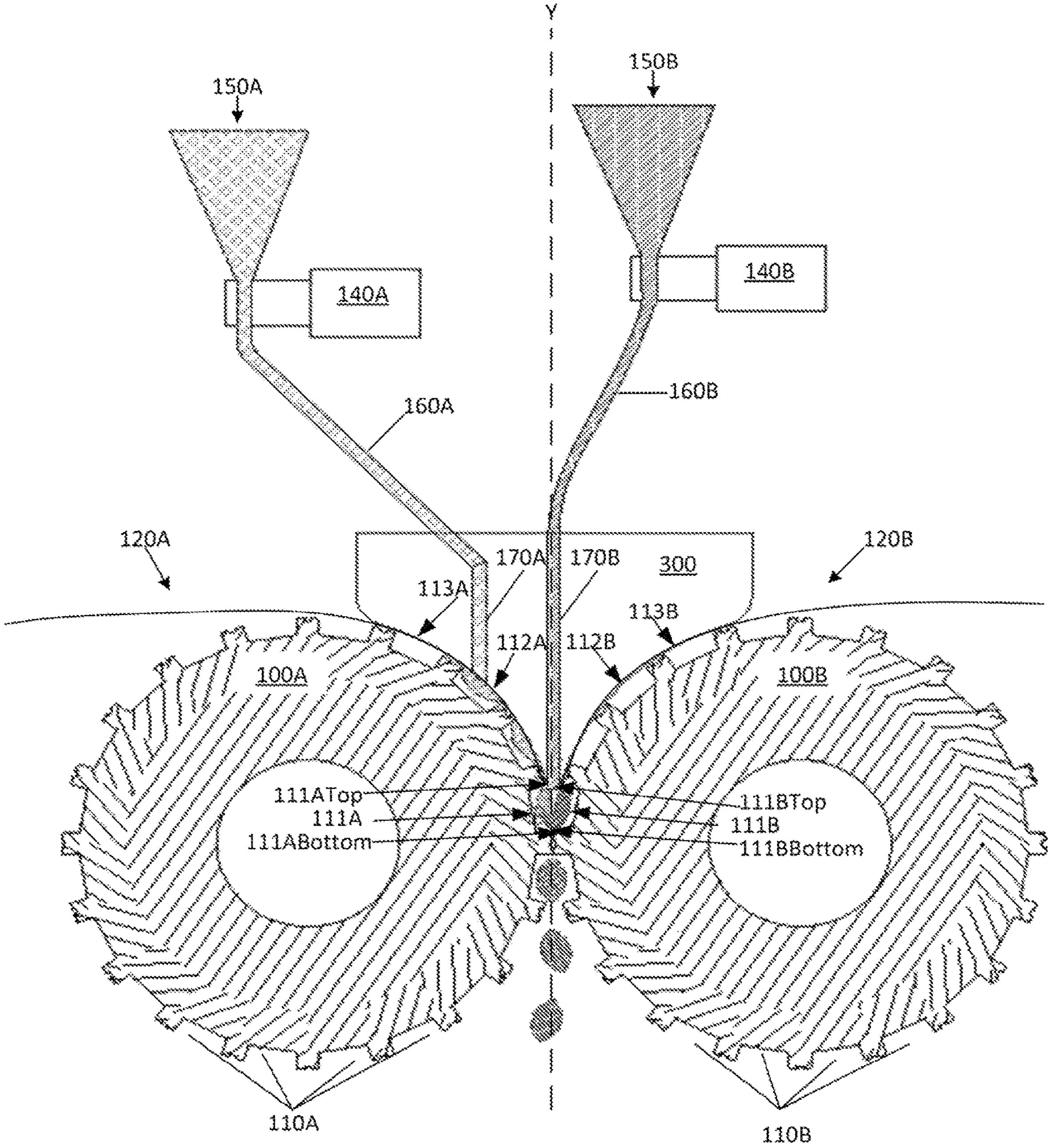
FIG. 2 illustrates a rotary die apparatus according to embodiments disclosed herein.

Although FIG. 1 depicts a single dispensing tube 130 aligned with the first center cavity 111A and the second center cavity 111B, the instant disclosure also encompasses the presence of additional dispensing tube(s). One exemplary embodiment of a two part encapsulation rotary die system with two separate dispensing tubes is depicted in FIG. 2, described in further detail below. It should be understood that in certain embodiments, additional dispensing tubes may also be incorporated into the encapsulation rotary die systems described herein (e.g., three dispensing tubes, four dispensing tubes, and so on).

FIG. 2 illustrates a rotary die apparatus according to embodiments disclosed herein. The rotary die encapsulation system in FIG. 2 includes similar components having similar relationships (i.e., connections and/or positioning) as those described with respect to FIG. 1 (e.g., first rotary die 100A, second rotary die 100B, first set of die cavities 110A, second set of die cavities 110B, continuous first film 120A, continuous second film 120B, wedge 130, first reservoir/container 150A, second reservoir/container 150B, first mechanical dispensing mechanism 140A, second mechanical dispensing mechanism 140B, first feeding tube 160A and second feeding tube 160B).

FIG. 2 is different from FIG. 1 in that it introduces an embodiment where two separate dispensing tubes, first dispensing tube 170A and second dispensing tube 170B, are integrated into wedge 300 and are positioned laterally from each other (e.g., side-by-side or adjacent to each other).

In the embodiment depicted in FIG. 2, first dispensing tube 170A is positioned off-center in wedge 300 and is aligned with a first off-center cavity 112A in the first set of die cavities 110A in rotary die 100A. The center of the wedge 300 in FIG. 1 is depicted along vertical axis Y. In this configuration, the first mechanical dispensing mechanism 140A, coupled to a first feeding tube 160A and to first reservoir/container 150A, is configured for dispensing a first amount of a first fill composition from a first reservoir/container 150A via the first feeding tube 160A to first dispensing tube 170A and ultimately injecting it into the first off-center cavity 112A to form a first half capsule (which, upon timely counter rotation of the first and second rotary dies, will form, together with the second half capsule from second off-center cavity 112B, a complete capsule).

Further, in the embodiment depicted in the embodiment depicted in FIG. 2, second dispensing tube 170B is integrated into the center of wedge 300 (depicted along vertical axis Y). Second dispensing tube 170B is aligned with a first center cavity 111A in the first set of die cavities 110A of the first rotating encapsulation die 100A and with a second center cavity 111B in the second set of die cavities 110B of the second rotating encapsulation die 100B. The first center cavity 111A and the second center cavity 111B together form a first pair 111 of die cavities.

In this configuration, the second mechanical dispensing mechanism 140B, coupled to the second reservoir/container 150B and to the second feeding tube 160B, is configured for dispensing a second amount of a second fill composition from a second reservoir/container 150B via a second feeding tube 160B to second dispensing tube 170B and ultimately injecting it into first center cavity 111A and second center cavity 111B to form a complete capsule.

Although not shown in FIG. 2, in certain embodiments, first dispensing tube 170A may be centered in wedge 300 and aligned with first center cavity 111A and second center cavity 111B and second dispensing tube 170B may be off-centered in wedge 300 and aligned with an off-center cavity (such as first off-center cavity 112A or second off-center cavity 112B (together forming a second pair of cavities 112) or with third off-center cavity 113A or fourth off-center cavity 113B (together forming a third pair of cavities 113) or any other off-center cavity, whether or not it is labeled in FIG. 2). In this scenario, first dispensing tube 170A is configured to inject the first amount of the first composition into first center cavity 111A and second center cavity 111B jointly and second dispensing tube 170B is configured to inject the second amount of the second composition into one of off-center cavities (e.g., 112A, 112B, 113A, or 113B, or any other off-center cavity) that it is aligned with.

Similarly, although not shown in FIG. 2, in embodiments where first dispensing tube 170A is positioned off-center in wedge 300, it may be aligned with any off-center cavity that is proximate to wedge 300 (e.g., 112A, 112B, 113A, 113B, or any other off-center cavity). In this scenario, first dispensing tube 170A is configured to inject the first amount of the first composition into one of off-center cavities (e.g., 112A, 112B, 113A, or 113B, or any other off-center cavity) that it is aligned with.

Additionally, in certain embodiments, both dispensing tubes, 170A and 170B, may be positioned off-center in wedge 300 and each dispensing tube may be aligned with any off-center cavity that is proximate to wedge 300 (e.g., 112A, 112B, 113A, or 113B, or any other off-center cavity). In this scenario, each of first dispensing tube 170A and second dispensing tube 170B is configured to inject the first amount of the first composition and the second amount of the second composition, respectively, into one of off-center cavities that the particular dispensing tube is aligned with (e.g., 112A, 112B, 113A, or 113B, or any other off-center cavity).

When a particular dispensing tube is centered in wedge 300, it fills two halves of one capsule jointly (e.g., by filling first center cavity 111A and second center cavity 111B jointly). When a particular dispensing tube is positioned off-center in wedge 300, it fills one half of a capsule (e.g., by filling first off-center cavity 112A or third off-center cavity 113A) and that half capsule upon timely counter rotation of the first and second rotary dies, will form, together with the second half capsule (e.g., second off-center cavity 112B or fourth off-center cavity 113B, respectively), a complete capsule. In the embodiments depicted in the Figures, first center cavity 111A and second center cavity 111B form a first pair of die cavities 111 that join into one complete capsule, first off-center cavity 112A and second off-center cavity 112B form a second pair of die cavities 112 that join into one complete capsule, third off-center cavity 113A and fourth off-center cavity 113B form a third pair of die cavities 113 that join into one complete capsule.

In the embodiment depicted in FIG. 2, first feeding tube 160A transitions into first dispensing tube 170A and may be an integral continuation of first dispensing tube 170A. Alternatively, first feeding tube 160A may be a separate component from first dispensing tube 170A and the two may be joined/coupled to form a continuous pathway for the first fill composition from the first reservoir/container 150A, via first feeding tube 160A, to first dispensing tube 170A, and ultimately into at least one of the cavities that first dispensing tube 170A is aligned with.

Similarly, second feeding tube 160B transitions into second dispensing tube 170B and may be an integral continuation of second dispensing tube 170B. Alternatively, second feeding tube 160B may be a separate component from second dispensing tube 170B and the two may be joined/coupled to form a continuous pathway for the second fill composition from the second reservoir/container 150B, via second feeding tube 160B, to second dispensing tube 170B, and ultimately into at least one of the cavities that second dispensing tube 170B is aligned with.

In certain embodiments, the system depicted in FIG. 2 (similar to the system of FIG. 1) further include a synchronization mechanism (not shown) configured to precisely time the dispensing of the first amount from the first fill composition and/or the second amount from the second fill composition with the rotation of the first and second rotary dies.

A variety of mechanical dispensing mechanisms may be utilized in the systems described herein. The type of mechanical dispensing mechanism may depend on the fill composition. In certain embodiments, the first fill composition and the second fill composition are independently a gas, solid particles suspension, a liquid, or a combination thereof.

In certain embodiment, first mechanical dispensing mechanism 140A and second mechanical dispensing mechanism 140B is a pump. A suitable pump may be chosen from a variety of positive displacement pumps that provide sufficient accuracy and precision to deliver the volume required to dispense the desired first amount of the first fill composition and second amount of the second fill composition to the die cavity (or die pocket). Other mechanical dispensing mechanisms may be used in the systems disclosed herein so long as they are configured to accurately and precisely control the composition of the capsule content (e.g., the volume of fill composition in each capsule).

In certain embodiments, the pump may be of any number of positive displacement designs suitable for dispensing other fill composition types. In certain embodiments, the pump may include a plunger or a piston style (e.g., where the fill composition dispensed with said dispensing mechanism is comprised of solid particles with, e.g., increased particle size). Suitable dispensing mechanism may be modified to adjust to the fill composition that is being dispensed. For instance, the inlet and outlet orifices of the mechanical dispensing mechanism may be modified (e.g., to transition or eliminate constriction in the flow path that may otherwise trap the particles and allow them to build up causing a plugged condition), the pump may be modified (e.g., such that the plunger maintains sufficient clearance from the head of the pump at its maximal injection position, and/or is profiled in a manner to facilitate clearance of the particles between the plunger face and head walls of the pump), and so on.

Figure 3:
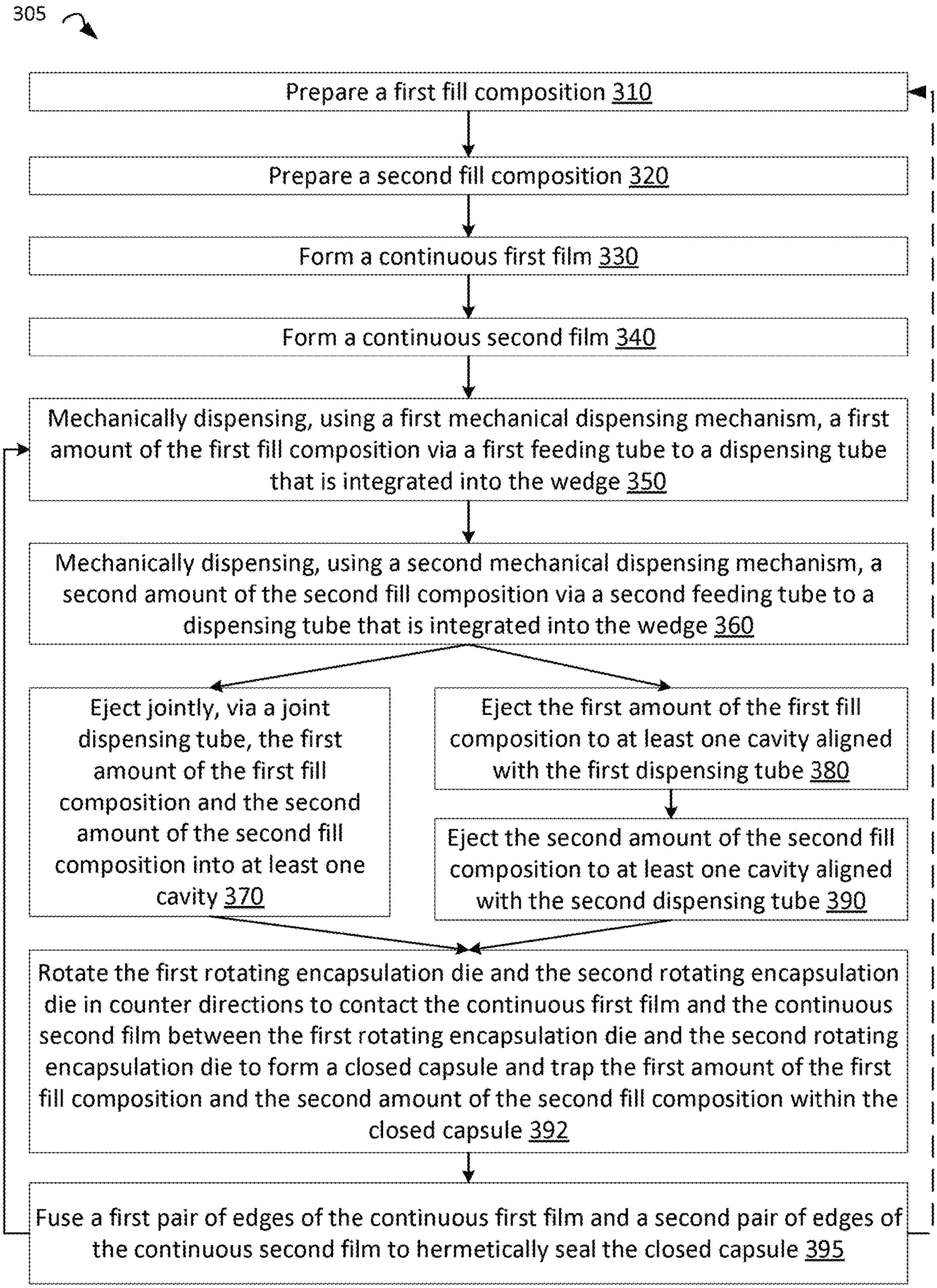
FIG. 3 depicts a method for preparing any of the dosage forms described herein.

The two part rotary die encapsulation systems described hereinbefore may be utilized for improving content uniformity of a multi-phase fill composition. This approach is useful when the final composition would be prone to phase separation, thereby making conventional processing difficult. Accordingly, in certain embodiments, the instant disclosure is directed to a method for improving content uniformity of a multi-phase fill composition. FIG. 3 depicts such method 305.

In certain embodiments, method 305 includes preparing a first fill composition in block 310. Method 305 further includes preparing a second fill composition in block 320. In certain embodiments, the first fill composition includes pharmaceutically acceptable excipients (e.g., medium chain triglycerides) and the second fill composition includes an active pharmaceutical ingredient (API) (by itself or along with additional pharmaceutically acceptable excipients).

In certain embodiments, method 305 further includes, in block 330, forming a continuous first film (e.g., 120A) on a first rotating encapsulation die (e.g., 100A) comprised of a first set of die cavities (e.g., 110A). In certain embodiments, method 305 further includes, in block 340, forming a continuous second film (e.g., 120B) on a second rotating encapsulation die (e.g., 100B) comprised of a second set of die cavities (e.g., 110B).

In certain embodiments, method 305 further includes, in block 350, mechanically dispensing, using a first mechanical dispensing mechanism (e.g., 140A), a first amount of the first fill composition (filled in first reservoir/container, such a 150A) via a first feeding tube (e.g., 160A) to a dispensing tube (e.g., 130 or 170A). The dispensing tube (e.g., 130 or 170A) is integrated into a wedge (e.g., 300) in accordance with any of the embodiments described hereinbefore with respect to the rotary die encapsulation system.

In certain embodiments, method 305 further includes, in block 360, mechanically dispensing, using a second mechanical dispensing mechanism (e.g., 170B), a second amount of the second fill composition via a second feeding tube (e.g., 160B) to a dispensing tube (e.g., 130 or 170B).

Mechanically dispensing may be performed through various mechanical dispensing mechanisms, such as, with a dispensing plunger, with an actuator (e.g., electromagnetic, rotary screw driven, cam driven, hydraulically driven, pneumatically driven and so on), with a pump in a batch configuration, with a pump in a continuous or semi-continuous configuration and so on.

Method 305, after block 360, may follow different paths, depending on the design of the rotary die encapsulation system. With a rotary die encapsulation system that has the first feeding tube and the second feeding tube converge into a joint dispensing tube (as shown in FIG. 1), method 305 further includes, in block 370, injecting jointly, via the joint dispensing tube (e.g., 130), the first amount of the first fill composition and the second amount of the second fill composition into at least one cavity. For instance, if the joint dispensing tube is positioned off-center in the wedge, the first amount of the first fill composition and the second amount of the second fill composition will be jointly injected into the off-center cavity that the joint dispensing tube is aligned with (e.g., 112A or 112B or 113A or 113B). In another example, if the joint dispensing tube is centered in the wedge, the first amount of the first fill composition and the second amount of the second fill composition will be jointly injected into the first center cavity (e.g., 111A) and into the second center cavity (e.g., 111B) simultaneously and/or jointly.

With a rotary die encapsulation system that has two separate dispensing tubes off-set laterally from each other (as shown in FIG. 2), method 305 further includes two separate injection pathways described in block 380 and 390.

In block 380, method 305 includes injecting the first amount of the first fill composition to at least one cavity that the first dispensing tube is aligned with. For instance, when the first dispensing tube (e.g., 170A) is centered in the wedge (e.g., 300) the first amount of the first fill composition is injected into first center cavity 111A and into second center cavity 111B jointly. In another example, when the first dispensing tube is positioned off-center in the wedge the first amount of the first fill composition is injected into one off-center cavity that the first dispensing tube is aligned with (e.g., 112A or 112B or 113A or 113B).

In block 390, method 305 includes injecting the second amount of the second fill composition to at least one cavity that the second dispensing tube is aligned with. For instance, when the second dispensing tube is centered in the wedge the second amount of the second fill composition is injected into first center cavity 111A and into second center cavity 111B jointly. In another example, when the second dispensing tube (e.g., 170B) is positioned off-center in the wedge (e.g., 300) the second amount of the second fill composition is injected into one off-center cavity that the second dispensing tube is aligned with (e.g., 112A or 112B or 113A or 113B).

In certain embodiments, injecting the first amount of the first fill composition, per block 380, and injecting the second amount of the second fill composition, per block 390, is done sequentially or simultaneously.

The term "sequentially" as used herein means that a first amount of a first fill composition is injected first and thereafter a second amount of the second fill composition is administered second. The subsequent injection of the second fill composition may begin during the injection of the first fill composition or after injection of the first fill composition has been completed.

The term "simultaneously" as used herein means that a first amount of a first fill composition is injected at the second amount of the second fill composition. In other words, injection of both fill composition initiates at the same time, whether or not it is completed at the same time.

The term "joint" as used herein means that the first amount of the first fill composition and the second amount of the second fill composition are injected into the same interior (e.g., the interior formed by first center cavity 111A and second center cavity 111B), whether the compositions are injected sequentially or simultaneously. Where the first amount of the first fill composition is injected into one half capsule (e.g., an off-center cavity such as 112A or 113A) and the second amount of the second fill composition is injected into a second half capsule (e.g., the corresponding pair of the first half capsule such as 112B or 113B respectively), the term "joint injection" would not apply.

In certain embodiments, method 305 further includes, in block 392, rotating the first rotating encapsulation die (e.g., 100A) and the second rotating encapsulation die (e.g., 100B) in counter directions to contact the continuous first film (e.g., 120A) and continuous second film (e.g., 120B) between the first rotating encapsulation die (e.g., 100A) and the second rotating encapsulation die (e.g., 100B) to form a closed capsule and trap the first amount of the first fill composition and the second amount of the second fill composition within the closed capsule between the continuous first film (e.g., 120A) and the continuous second film (e.g., 120B).

In certain embodiments, mechanically dispensing the first amount of the first fill composition, per block 350, is synchronized with the mechanically dispensing the second amount of the second fill composition, per block 360, and with the rotating of the first rotating encapsulation die and of the second rotating encapsulation die, per block 392. Further, the joint injection of the first amount of the first fill composition and the second amount of the second fill composition, per block 370, may also be synchronized with the mechanical dispensing of each fill composition and with the rotation of the rotating encapsulation dies. Similarly, the injecting the first amount of the first fill composition, per block 380, and the injecting of the second amount of the second fill composition, per block 390, may also be synchronized with the mechanical dispensing of each fill composition and with the rotation of the rotating encapsulation dies. Such synchronizations allows for timely trapping the first amount of the first fill composition and the second amount of the second fill composition within the closed capsule.

In certain embodiments, method 305 further includes, per block 395, fusing a first pair of edges of the continuous first film (e.g, 120A) and a second pair of edges of the continuous second film (e.g., 120B) to hermetically seal the closed capsule. For instance, first center cavity 111A and second center cavity 111B together are a first pair of cavities that can form one closed capsule by hermetically sealing a first pair of edge 111Atop and 111Btop and a second pair of edges 111Abottom and 111Bbottom. In a similar manner, first off-center cavity 112A and second off-center cavity 112B, which are together a second pair of cavities, can form another closed capsule by hermetically sealing their corresponding top pair of edges and bottom pair of edges. Likewise, third off-center cavity 113A and fourth off-center cavity 113B, which are together a third pair of cavities, can form yet another closed capsule by hermetically sealing their corresponding top pair of edges and bottom pair of edges. Any other pair of off-center cavities may, upon counter rotation of the first and second rotary dies, meet to form a closed capsule that can be hermetically sealed by sealing the pairs' corresponding bottom pair of edges and top pair of edges.

Blocks 350, 360, 370 (or 380-390), 392, and 395 of method 305 may be repeated to form a plurality of closed capsules. In certain embodiments, upon fully utilizing the first fill composition prepared in block 310 and/or second fill composition prepared in block 320 and/or the continuous first film formed in block 330 and/or the continuous second film formed in block 340, one or more of blocks 310, 320, 330, and/or 340 may also be repeated to prepare additional first fill composition and/or prepare additional second fill composition and/or form more continuous first film and/or form more continuous second film, as needed.

When forming a plurality of closed capsules having a multi-phase fill composition, method 305 may be utilized to minimize the variability in the multi-phase fill composition amongst the plurality of closed capsules. In certain embodiments, there is substantially no variability in the multi-phase fill composition amongst the plurality of closed capsules prepared as per the methods described herein (e.g., method 305). The term "substantially no variability" as used herein, refers to each capsule having a substantially uniform composition of each phase. For instance, the multi-phase fill composition in one capsule may vary by up to about 10%, up to about 8%, up to about 5%, up to about 2%, or up to about 1% in the weight amount of each phase from another capsule prepared by the same process.

Any reference in the systems and methods described herein to a "first" component (e.g., first dispensing tube, first feeding tube, first container, first dispensing mechanism, and so on) or to a "second" component (e.g., second dispensing tube, second feeding tube, second container, second dispensing mechanism, and so on) are only utilized to distinguish the various components and do not imply an order of operating or assembling them. In certain embodiments, the "first" components may be utilized first and the "second" components may be utilized second.

In certain embodiments, the "second" components may be utilized first and the "first" components may be utilized second. In certain embodiments, the "first" components and the "second" components may be utilized simultaneously.

The methods described herein (e.g., method 305) minimize problems of phase segregation in multi-phase systems by dividing the formulations into two parts. One part (e.g., first fill composition) may represent the major phase of the formulation. The second part (e.g., the second fill composition) may represent the minor phase of the formulation. The first and second parts of the formulation would be individually metered (or dispensed and/or fed) to the wedge and injected through the wedge into the cavity (ultimately forming the capsule) either through separate orifices (i.e, separate dispensing tubes) or through a common orifice (i.e., joint dispensing tube).

In certain embodiments, the second part of the formulation would be formulated to have properties (e.g., a rheology) that would minimize segregation issues. This could be done by controlling the solids ratio of the second formulation part. This may also be done by additional of excipients designed to provide a desired rheology (as illustrated in Example 2). Since the composition of the second part of the formulation can be made very concentrated, the total amount of excipients used to modify the rheology would be less to attain the desired rheology than the total amount of excipients that would otherwise be used in formulation made via conventional one part methods (as illustrated in Example 2).

Two part formulation methods described herein can facilitate the ability to improve the homogeneity of the API in the capsule while minimizing impact on the composition of the formulation. This method is useful in various scenarios, such as, with low viscosity multi-phase systems, when a low concentration of minor phase is present, when there are large density differentials between phases, when there are high separation rates of the minor phase (e.g., large particle size), and the like. The methods described herein may be less applicable to highly viscous systems since it is believed (without being construed as limiting) that with increased viscosity less phase segregation is observed.

For instance, one application of the two part rotary die encapsulation system involves splitting a low viscosity multi-phase formulation into a first fill composition and a second fill composition, where the first fill composition has a first viscosity and the second fill composition has a second viscosity. The second viscosity of the second fill composition may be designed to be higher than the first viscosity of the first fill composition in order to provide for uniform API distribution in the second fill composition. In this application, a first amount of the first fill composition and a second amount of the second fill composition can be accurately and precisely incorporated into a single capsule to achieve a final low viscosity multi-phase formulation having precise and accurate amounts of each phase.

The methods described herein allow for manufacturing of capsules with multiple phases, which would otherwise be challenging or impossible to encapsulate with a single mechanical dispensing mechanism (such as a pump). This may be attained, in part, due to the presence of a plurality of dispensing mechanisms, with each dispensing mechanism handling a separate phase. The methods and systems described herein also allow for attaining uniform, accurate, and precise fill compositions in each capsule.

The concept of dispensing a multiphase liquid formulation in conjunction with the rotary die process can be expanded to include multiphase systems composed of liquids with liquids, gases with liquids, solids with liquids to allow for accurate dispensing of each phase which would otherwise be difficult to maintain homogenous during a conventional encapsulation process. In certain embodiments, the first fill composition and the second fill composition are independently selected from a gas, solid particles suspension, a liquid, or a combination thereof. In certain embodiments, one phase (e.g., the major phase) may be a liquid phase and a second phase (e.g., the minor phase) may be comprised of solid inclusions.

In embodiments where one of the phases is comprised of solid particles, the solid particles can range in size from submicron to as large as the pump and wedge plumbing can handle. Exemplary solid particles the may be encapsulated with the methods described herein, include, without limitations, beads, tablets, capsules, caplets, pellets, granules, and combinations thereof. The solid particles may have a shape selected from round, oval, oblong, and spherical.

In certain embodiments where one of the phases is comprised of solid particles, the encapsulation may be transitioned from a suspension with solid particles having a very small particle size to encapsulation of large sized discrete particles or beads in a capsule. When the particles or beads are large, it may be possible to inject the particles or beads discretely into the capsule as opposed to as a traditional one-part suspension. As the size of the particle transitions from small to large, the task of dispensing them homogenously becomes more difficult due to the tendency of the particles for increased separation rates, due to the reduced ability of the pump to handle such formulations without becoming plugged, and/or due to the challenge in minimizing damage to the particles which in some instances could be fragile. The systems and methods described herein can cope with these challenges by providing flexibility in modifying the mechanical dispensing mechanism (e.g., the pump), the wedge, and the plumbing to minimize plugging of the equipment and/or damage to the particles.

Another application of the methods described herein is when filling a multi-component formulation into a capsule and the amount of one component in the formulation is to be measured with greater precision and accuracy as compared to other components in the formulation. In this application, the mechanical dispensing mechanism (e.g., dispensing pump) for the component requiring higher accuracy and precision could be selected from pumps with high accuracy and precision while the remaining components can be dispensed using a standard mechanical dispensing mechanism (e.g., standard performance pumps). In this application the multi-component composition of the formulation could be comprised of miscible components that become a single phase within the capsule through diffusion, immiscible components, or partially miscible components that form a multiphase system in the capsule.

Such application may also be suitable for efficiently manufacturing multiple doses of a highly potent API to be used for titrating patients to attain a particular response (as illustrated in Example 3). This is attainable by using two stock solutions, where one stock solution is a diluent and another stock solution includes a high concentration of API. A range of different capsule strengths may be prepared by adjusting the ratios of the amounts of the two stock solutions that are added to each capsule. In other words, adjusting the ratios of a first amount from a first fill composition (that is a diluent) to a second amount from a second fill composition (that is a concentrated API solution) is configured to tune the dose strength of the capsule's final fill composition. For instance, increasing the ratio of the first amount to the second amount (i.e., increasing ratio of diluent to concentrated API solution) reduces the dose strength of the capsule's final fill composition. In a similar manner, decreasing the ratio of the first amount to the second amount (i.e., decreasing the ratio of diluent to concentrated API solution) increases the dose strength of the capsule's final fill composition.

In certain embodiments, the instant disclosure is directed to dosage forms prepared by any of the methods and with any of the rotary die encapsulation systems described herein. The dosage form may be a capsule having a shell composition and a fill composition.

The shell of the capsule (e.g., soft gelatin capsule) may be formed from plasticized gelatin or other functional polymeric materials that are typically used for encapsulation of liquids, fluids, pastes or other fill compositions.

The outer shell of the capsule may be coated with one or more coatings, including but not limited to, immediate release coatings, protective coatings, enteric or delayed release coatings, sustained release coating, barrier coatings, and combinations thereof. The one or more coatings on the outer shell of the capsule may be useful to provide controlled release of the capsule, protect the shell from degradation, or deliver one or more active ingredients in the dosage form. Alternatively, additives such as pectin or synthetic polymers may be incorporated into the capsule shell to slow or target the dissolution on ingestion. The one or more coatings on the outer shell of the softgel capsule may be applied by any conventional technique, including but not limited to, pan coating, fluid bed coating or spray coating.

The fill composition of the capsule may be a liquid fill, a gas fill, a semi-solid fill, a multi-phase fill, and so on. The multi-phase fill (if present) may include different phases which may be, e.g., layered side-by-side in the softgel capsule. Each layered phase may incorporate an active ingredient or multiple active ingredients.

The fill compositions may also include excipients known in the art of capsule encapsulation such as dispersants, surfactants, plasticizers, antioxidants, flavoring agents, opacifying agents, preservatives, embrittlement inhibiting agents, colorants, dyes and pigments, and disintegrants.

Suitable active ingredients to be encapsulated in the dosage forms described herein may comprise APIs, nutritional supplements, substances used for therapeutic or cosmetic (e.g., non-pharmacologic action) purposes, functional excipients or combinations of active ingredients and functional excipients that control or otherwise affect the release of the active ingredient(s) into the gastrointestinal tract or site of absorption. If different phases are present in a capsule (e.g., a solid inclusion and a liquid fill or a semi-solid fill), each phase may contain one or more active ingredient(s). The active ingredient(s) in the different phases may be the same or different.

The present invention contemplates the use of any active ingredients known in the art. It is well within the knowledge of a skilled person in the art to select a particular combination of active ingredients or medicaments. In some embodiments, active ingredients may include, but are not limited to, the following: APIs, nutraceuticals, nutritional supplements, therapeutic substances, cosmetic ingredients (e.g., non-pharmacologic action) such as glycine and DHA, and functional excipients.

Suitable APIs may include, but are not limited to, the following: analgesics, anti-inflammatory agents, anti-helminthics, anti-arrhythmic agents, anti-asthma agents, anti-bacterial agents, anti-viral agents, anti-coagulants, anti-dementia agents, anti-depressants, anti-diabetics, anti-epileptics, anti-fungal agents, anti-gout agents, anti-hypertensive agents, anti-malarials, anti-migraine agents, anti-muscarinic agents, anti-neoplastic agents, immunosuppressants, anti-protozoal agents, anti-pyretics anti-thyroid agents, anti-tussives, anxiolytics, sedatives, hypnotics, neuroleptics, neuroprotective agents, beta-blockers, cardiac inotropic agents, cell adhesion inhibitors, corticosteroids, cytokine receptor activity modulators, diuretics, anti-Parkinson's agents, gastrointestinal agents, histamine H-receptor antagonists, HMG-COA reductase inhibitors, keratolytics, lipid regulating agents, muscle relaxants, nitrates and other anti-anginal agents, non-steroid anti-asthma agents, nutritional agents, opioid analgesics, sex hormones, stimulants, and anti-erectile dysfunction agents.

Suitable nutraceuticals may include, but are not limited to, 5-hydroxytryptophan, acetyl L-carnitine, alpha lipoic acid, alpha-ketoglutarates, bee products, betaine hydrochloride, bovine cartilage, caffeine, cetyl myristoleate, charcoal, chitosan, choline, chondroitin sulfate, coenzyme Q10, collagen, colostrum, creatine, cyanocobalamin (Vitamin 812), dimethylaminoethanol, fumaric acid, germanium sequioxide, glandular products, glucosamine HCl, glucosamine sulfate, hydroxyl methyl butyrate, immunoglobulin, lactic acid, L-Carnitine, liver products, malic acid, maltose-anhydrous, mannose (d-mannose), methyl sulfonyl methane, phytosterols, picolinic acid, pyruvate, red yeast extract, S-adenosylmethionine, selenium yeast, shark cartilage, theobromine, vanadyl sulfate, and yeast.

Suitable nutritional supplements may include vitamins, minerals, fiber, fatty acids, amino acids, herbal supplements or a combination thereof.

Suitable vitamins may include, but are not limited to, the following: ascorbic acid (Vitamin C), B vitamins, biotin, fat soluble vitamins, folic acid, hydroxycitric acid, inositol, mineral ascorbates, mixed tocopherols, niacin (Vitamin B3), orotic acid, para-aminobenzoic acid, panthothenates, panthothenic acid (Vitamin B5), pyridoxine hydrochloride (Vitamin B6), riboflavin (Vitamin B2), synthetic vitamins, thiamine (Vitamin B1), tocotrienols, vitamin A, vitamin D, vitamin E, vitamin F, vitamin K, vitamin oils and oil soluble vitamins.

Suitable herbal supplements may include, but are not limited to, the following: arnica, bilberry, black cohosh, cat's claw, chamomile, echinacea, evening primrose oil, fenugreek, flaxseed, feverfew, garlic, ginger root, ginko biloba, ginseng, goldenrod, hawthorn, kava-kava, licorice, milk thistle, psyllium, rauowolfia, senna, soybean, St. John's wort, saw palmetto, turmeric, valerian. Minerals may include, but are not limited to, the following: boron, calcium, chelated minerals, chloride, chromium, coated minerals, cobalt, copper, dolomite, iodine, iron, magnesium, manganese, mineral premixes, mineral products, molybdenum, phosphorus, potassium, selenium, sodium, vanadium, malic acid, pyruvate, zinc and other minerals.

The present invention may reduce problems, such as time and expense, associated with tuning dosing of multi-component formulations and/or formulating multi-phase formulations. The method and system described herein provide the capability to tune the dosing of a capsule fill composition in-situ. In this manner, a variety of doses can be manufactured in a single batch on an as-needed basis without manufacturing an entire batch of one capsule fill composition dose followed by another full batch of another capsule fill composition dose. Further, the method and system described herein provide the capability to control the content of multi-phase formulations in a safe and efficacious manner to ensure content uniformity across a plurality of capsules. The present invention may reduce the need for rheology modifying excipients to attain the content uniformity across a plurality of capsules. As such, it may be possible to use smaller and cheaper dosage forms.

ILLUSTRATIVE EXAMPLE

The following prophetic examples are set forth to assist in understanding the invention and should not be construed as specifically limiting the invention described and claimed herein. Such variations of the invention, including the substitution of all equivalents now known or later developed, which would be within the purview of those skilled in the art, and changes in formulation or minor changes in experimental design, are to be considered to fall within the scope of the invention incorporated herein.

Example 1: Two Part Rotary Die Encapsulation to Minimize Phase Segregation Processing Issues

Comparative Example 1A

A formulation that includes 10 mg of an active pharmaceutical ingredient (API) in 990 mg of medium chain triglyceride (MCT) oil with a 1 g fill volume is prepared. The viscosity of this composition is too low to prevent segregation and would result in capsules containing a high variation of API content.

Inventive Example 1B

According to processes described herein, one way to prevent phase segregation with this formulation is to split the formulation to two formulation parts as follows: a) part 1 includes 975 mg MCT, and b) part 2 includes 10 mg API in 15 mg MCT. Upon splitting, the solids loading of part 2 is 40% and results in a flowable paste with sufficient viscosity to prevent segregation of the API. By metering the two formulation parts to the wedge individually, an accurate dose of API is more easily accomplished than if it were handled as a dilute one-part suspension.

Example 2: Two Part Rotary Die Encapsulation to Minimize Phase Segregation Processing Issues with Reduced Rheology Modifying Excipient Usage

Comparative Example 2A

A formulation that includes 10 mg of an API, 740 mg of MCT oil, and 250 mg excipient for adjusting the rheology of the formulation, for a total of 1000 mg. The amount of excipient is selected assuming that the concentration of excipient needed to adjust the rheology of the formulation to attain a formulation suitable for a one-part fill is 25 wt %, based on the total weight of the formulation.

Inventive Example 2B

In comparison, if a two-part metering approach, according to processes described herein is used, the part 2 portion can be concentrated and would not require as much of the rheology modifying excipient. For the sake of comparison, it is assumed that the amount of rheology modifying excipient will still have the same ratio of excipient to MCT is in the above comparative example 2A (about 250:740).

The two formulation parts now become: a) part 1-760 mg MCT, and b) part 2-10 mg API, 170 mg MCT, and 60 mg rheology modifying excipient.

This results in a reduction per capsule of rheology modifying excipient from 250 mg in a one-part system of comparative example 2A to 60 mg in a two-part system of inventive example 2B.

Example 3: Two Part Rotary Die Encapsulation to Tune API Dose in a Capsule

A product requiring 10 strengths of a highly potent API can be formulated as a two-part formulation containing a two part formulation system, where: a) part 1 is a highly concentrated API part, and b) part 2 is a diluent part.

Using this approach, only two formulation parts may be prepared and the ratio of the two formulation parts can be adjusted during encapsulation to tune the API dose in the capsule, as shown in Table 1 below. This reduces the need for manufacturing distinct batches for each API dose, as is done with the traditional approach of a single part injection.

TABLE 1

API Dose Tuning

| Dose (wt % API) | Part 1 - Concentrated API (μL) | Part 2 - Diluent (μL) | Capsule Total (μL) |
|---|---|---|---|
| ~9 wt % API | 20 | 200 | 220 |
| ~14 wt % API | 30 | 190 | 220 |
| ~18 wt % API | 40 | 180 | 220 |
| ~23 wt % API | 50 | 170 | 220 |

Example 4: Two Part Rotary Die Encapsulation Forming a Gas/Liquid/Solid Multiphase Capsule The first fill composition includes a concentrated solution of API in an alcohol.

The second fill composition includes nitrogen or air.

A first amount of the first fill composition (concentrated solution of API in alcohol) is combined with a second amount of the second fill composition (nitrogen or air) in a gelatin shell composition (formed from a continuous first film of gelatin and a continuous second film of gelatin). Upon drying the alcohol will evaporate through the shell leaving the API and nitrogen in the capsule. Since the volume of alcohol/API is small relative to the total volume of nitrogen in the capsule, the capsule will not collapse from loss of volume of the alcohol.

For simplicity of explanation, the embodiments of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

In the foregoing description, numerous specific details are set forth, such as specific materials, dimensions, processes parameters, etc., to provide a thorough understanding of the present invention. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment.

The present invention has been described with reference to specific exemplary embodiments thereof. The specification and drawings are, accordingly, to be regarded in an illustrative rather than a restrictive sense. Various modifications of the invention in addition to those shown and described herein will become apparent to those skilled in the art and are intended to fall within the scope of the appended claims.

What is claimed is:

1. A system comprising:

a first rotating encapsulation die comprising a first set of die cavities;

a continuous first film on the first rotating encapsulation die;

a second rotating encapsulation die comprising a second set of die cavities;

a continuous second film on the second rotating encapsulation die;

a wedge positioned between the first rotating encapsulation die and the second rotating encapsulation die;

one or more dispensing tubes integrated into the wedge and aligned with at least one cavity in the first set of die cavities or in the second set of die cavities, the one or more dispensing tubes configured to inject a first fill composition and a second fill composition into the at least one cavity;

a first mechanical dispensing mechanism for dispensing a first amount of a first fill composition via a first feeding tube to the one or more dispensing tubes;

a second mechanical dispensing mechanism for dispensing a second amount of a second fill composition via a second feeding tube to the one or more dispensing tubes, and wherein the one of more dispensing tubes comprises a joint dispensing tube, wherein the first feeding tube and the second feeding tube converge into the joint dispensing tube, wherein the joint dispensing tube is positioned off-center in the wedge and is aligned with an off-center cavity in the first set of die cavities or in the second set of die cavities, the joint dispensing tube configured for dispensing jointly the first amount of the first fill composition and the second amount of the second fill composition into the off-center cavity.

2. The system of claim 1, further comprising a synchronization mechanism for synchronizing the rotation of at least one of the first rotating encapsulation die and the second rotating encapsulation die with at least one of the first mechanical dispensing mechanism and the second mechanical dispensing mechanism such that a first amount of the first fill composition and a second amount of the second fill composition are timely trapped in the at least one cavity in the first set of die cavities or in the second set of die cavities between at least one of the continuous first film or the continuous second film and the wedge.

* * * * *